United States Patent
Pons

(10) Patent No.: US 6,915,058 B2
(45) Date of Patent: Jul. 5, 2005

(54) RETRACTABLE OPTICAL FIBER ASSEMBLY

(75) Inventor: Sean M. Pons, Valdese, NC (US)

(73) Assignee: Corning Cable Systems LLC, Hickory, NC (US)

( * ) Notice: Subject to any disclaimer, the term of this patent is extended or adjusted under 35 U.S.C. 154(b) by 2 days.

(21) Appl. No.: 10/376,929

(22) Filed: Feb. 28, 2003

(65) Prior Publication Data

US 2004/0170369 A1 Sep. 2, 2004

(51) Int. Cl.$^7$ .................................................. G02B 6/00
(52) U.S. Cl. ....................................................... 385/135
(58) Field of Search ................................ 385/134, 135, 385/136, 137, 147; 242/378

(56) References Cited

U.S. PATENT DOCUMENTS 5,535,139 A 7/1996 Barringer et al. ........... 364/550
6,215,938 B1 4/2001 Reitmeier et al. .......... 385/135
6,484,958 B1 11/2002 Xue et al. ................. 242/378.1

FOREIGN PATENT DOCUMENTS

FR 2748576 11/1997 ............ G02B/6/44

*Primary Examiner*—Khiem Nguyen
(74) *Attorney, Agent, or Firm*—Christopher C. Dremann

(57) ABSTRACT

A retractable optical fiber assembly includes a housing, a spool rotatably disposed within the housing and an optical waveguide reeled onto the spool. The optical waveguide has a central length of unjacketed optical fiber and shorter end lengths of jacketed optical fiber terminating in optical connectors. The optical waveguide is reeled onto the spool such that the end lengths of jacketed optical fiber are extracted off the spool and retracted onto the spool in the same direction. The spool is biased in a first rotational direction relative to the housing by a torsion spring that exerts a retracting force on the jacketed optical fiber. A mechanical stop is also provided to prevent rotation of the spool in a second rotational direction opposite the first rotational direction. In an exemplary embodiment, the assembly is a test fiber box for use with optical test equipment to test an optical network.

24 Claims, 8 Drawing Sheets

RETRACTABLE OPTICAL FIBER ASSEMBLY

FIELD OF THE INVENTION

The invention relates to a retractable optical fiber assembly. More particularly, the invention relates to a retractable optical fiber assembly that can be used in conjunction with optical test equipment to test, qualify, evaluate, demonstrate, emulate, calibrate, or benchmark an optical system, optical network or optical equipment. In an exemplary embodiment, the invention is a test fiber box for use with an optical time domain reflectometer (OTDR) for testing of an optical network.

BACKGROUND OF THE INVENTION

A test fiber box, also commonly referred to as a "launch cord," "launch cable," "break-out box," "dead zone box" or "pulse suppressor" is typically utilized in conjunction with optical test equipment to test, qualify and evaluate the transmission characteristics of optical systems, optical networks or optical equipment. Examples of transmission characteristics include loss, length, time delay and reflectance. Test fiber boxes are primarily intended to increase the length of optical waveguide between optical test equipment, such as an optical time domain reflectometer (OTDR), and a component of an optical network for purposes of testing and analysis. Test fiber boxes are also used for product demonstration and training purposes, system emulation, and for equipment calibration and benchmarking. In certain circumstances, test fiber boxes have also been employed in conjunction with an optical power meter and optical light source, or related test equipment, as a jumper for loss testing. However, the use of a conventional test fiber box as a jumper is considered impractical due to weight, bulk, and cost considerations.

One conventional test fiber box includes a length of optical waveguide suitable for use with an OTDR to test the optical time domain reflectometry characteristics of an optical network. The length of optical waveguide necessary for OTDR testing typically ranges from about 50 meters to about 5 kilometers, and the optical waveguide typically consists of a central length of unjacketed optical fiber and shorter end lengths of jacketed optical fiber. The central length of unjacketed optical fiber is substantially longer than the end lengths of jacketed optical fiber. The optical waveguide can be continuous, or the end lengths of jacketed optical fiber can be fused to the central length of unjacketed optical fiber. Regardless, the optical waveguide is stored in a rigid enclosure with the central length of unjacketed optical fiber being inaccessible to the user and the end lengths of jacketed optical fiber being accessible to the user. The unjacketed optical fiber is typically stored in a separate compartment and the end lengths of jacketed optical fiber are typically wrapped together around two or more retaining posts to form loops of jacketed optical fiber within the enclosure. The jacketed optical fiber can be unwrapped to connect the optical test equipment (i.e., OTDR) to the optical network. The dimensions of the enclosure are typically about 9 inches×8 inches×3.5 inches for a length of optical waveguide between about 50 meters and about 5 kilometers.

The size and weight of conventional test fiber boxes, however, presents several problems. The test fiber box is generally too large to fit comfortably inside an OTDR transit case and must be transported separately, resulting in possible loss or misplacement of the test fiber box. If dropped or inadvertently moved, the weight of the test fiber box can cause damage to the OTDR, to the connector adapter in the optical network, or to the components of the test fiber box itself. Furthermore, field installers and technicians naturally tend to prefer smaller, lightweight test equipment, if only to reduce the bulk of their portable tools. Another problem with existing test fiber boxes is that the jacketed optical fiber and the optical connectors on the ends of the jacketed optical fiber are difficult to manage. The end lengths of jacketed optical fiber can easily become entangled as they are repeatedly unwrapped and rewrapped, thereby causing stress and damage to the optical waveguide (e.g., glass fiber) and jacket. In addition, the test fiber box may include a protective lid, which may be inadvertently closed and thereby damage the jacketed optical fiber or connectors. Furthermore, protective caps (e.g., dust caps) for the optical connectors are easily misplaced, thereby subjecting the connectors to possible damage from dust, dirt or debris.

Although existing test fiber boxes provide for storage of the optical waveguide and connectors, that is not their primary purpose. Fiber optic storage reels are available to store excess lengths of optical waveguide in optical network enclosures, such as splice trays, distribution boxes, cross-connect cabinets, and splice closures. However, fiber optic storage reels are primarily intended for storing relatively short lengths of slack optical waveguide. Fiber optic storage reels are also available in which the optical waveguide is coiled on the reel in such a manner that the ends of the optical waveguide can be unwound from the reel at the same time and in the same direction. One such fiber optic storage reel includes an S-shaped or teardrop-shaped channel that receives the optical waveguide and reverses the direction of travel of one end, while maintaining the minimum bend radius of the optical waveguide. However, test fiber boxes typically employ relatively long lengths of unjacketed optical fiber to provide sufficient delay time for test signals to propagate. The known fiber optic storage reels do not provide adequate means for protecting and storing the long length of optical waveguide necessary for a test fiber box within a manageable size assembly.

DETAILED DESCRIPTION OF THE EMBODIMENTS

Figure 1:
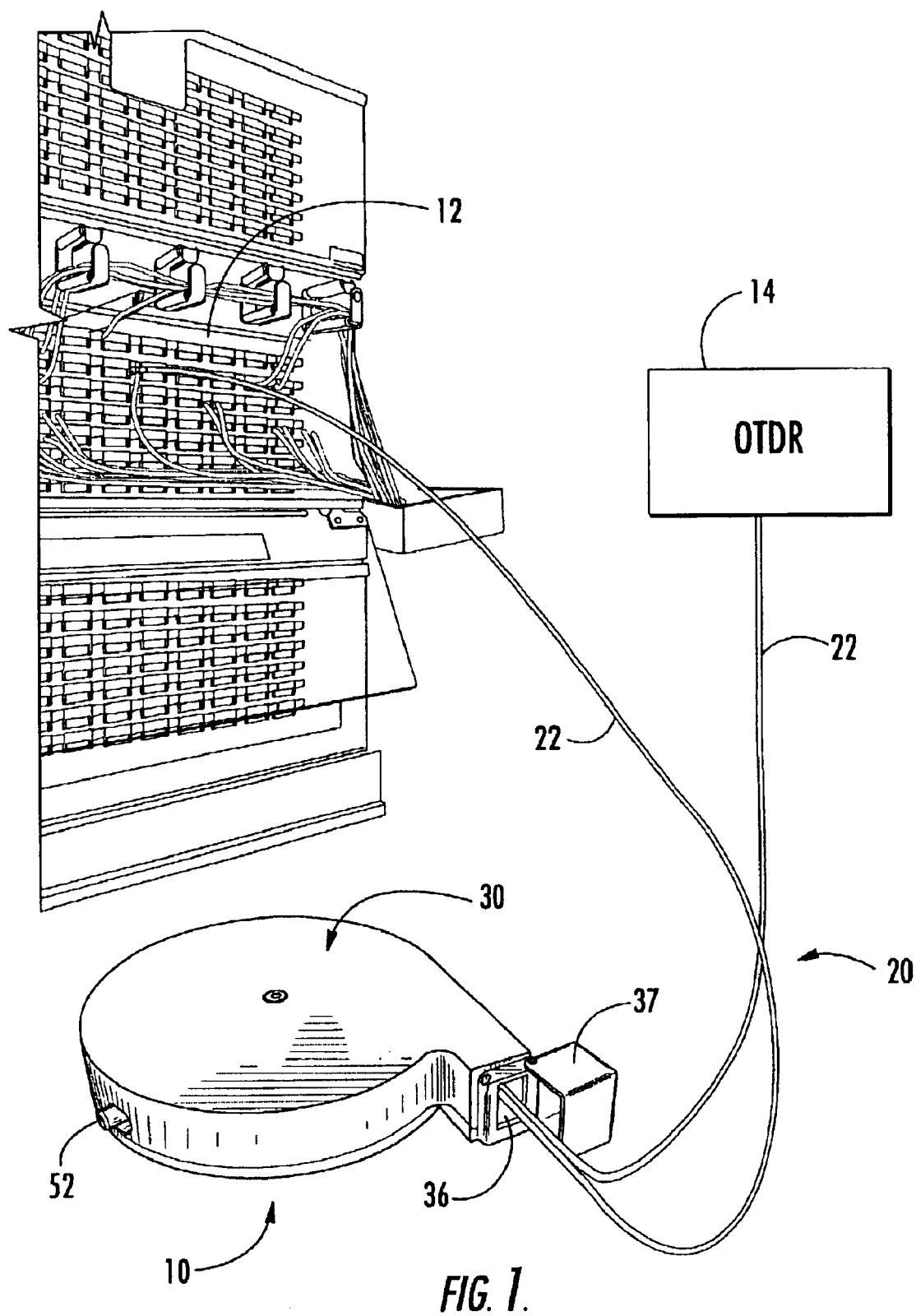
FIG. 1 is a perspective view illustrating an exemplary manner in which a retractable optical fiber assembly constructed in accordance with the invention may be used to connect optical test equipment, such as an optical time domain reflectometer (OTDR), to an optical network.

A retractable optical fiber assembly 10 in accordance with the invention is especially suited for connecting optical test equipment 14 to an optical network 12 so that the optical network can be tested, evaluated, qualified, demonstrated, calibrated, monitored or otherwise analyzed. In the exemplary embodiments shown and described herein, the retractable optical fiber assembly 10 is an improved test fiber box suitable for use in conjunction with optical test equipment 14, such as an optical time domain reflectometer (OTDR), to test the optical network 12. The test fiber box 10 contains a predetermined length of optical waveguide 20 suitable for performing the required testing in conjunction with the OTDR 14. In particular, the test fiber box 10 functions in the same manner as a conventional "test fiber box," "launch cord," "launch cable," "break-out box," "dead zone box" or "pulse suppressor" to provide from about 50 meters to about 5 kilometers length of optical waveguide to enhance the optical transmission readings on the OTDR 14. The test fiber box 10 not only provides for compact, retractable storage of the relatively long optical waveguide 20, but also completely encloses and protects the optical waveguide 20 when it is not in use. The compact nature of the test fiber box 10 is especially suitable for use in relatively tight quarters, such as cramped wiring closets containing optical distribution panels, optical cross connect panels or other components commonly employed in optical networks.

The optical waveguide 20 used in the test fiber box 10 comprises a continuous length of optical fiber that is reeled onto a rotatable spool 40 and disposed within an enclosure, or housing 30. The optical waveguide 20 can be extracted off the spool 40 or retracted onto the spool 40 by rotating the spool 40 in opposite directions relative to the housing 30. Preferably, the optical waveguide 20 is a single, continuous optical fiber. However, optical waveguide 20 may be formed by fusing multiple fiber portions together, as will be described. Furthermore, either single mode optical fiber or multimode optical fiber may be employed in test fiber box 10, depending of course upon the test and the optical network with which the test fiber box 10 will be used. In the exemplary embodiment shown and described herein, the optical waveguide 20 comprises a central length of unjacketed optical fiber 21 and shorter end lengths of jacketed optical fiber 22 on the opposite ends 25 of the unjacketed optical fiber 21. The central length 21 is unjacketed to reduce the bulk of the optical waveguide 20 that must be stored within the housing 30, and thereby reduce the necessary diameter and/or width of the spool 40 and the housing 30. The central length of unjacketed optical fiber 21 accounts for the majority of the length of optical waveguide 20 contained within the test fiber box 10. The end lengths of jacketed optical fiber 22 make up the portion of the optical waveguide 20 that will be extracted from the housing 30 when the test fiber box 10 is connected between the optical test equipment (i.e., OTDR) 14 and, for example, the adapter of a fiber optic connector in the optical network 12. In an exemplary embodiment, the test fiber box 10 contains about 1000 meters of optical waveguide 20 and the length of each end length of jacketed optical fiber 22 is only about 1 meter to about 3 meters in length.

In the preferred embodiment using a continuous optical waveguide 20, the end lengths of jacketed optical fiber 22 can be formed by inserting each end 25 of the optical waveguide 20 into a fanout tubing having the desired length. Each end length of jacketed optical fiber 22 preferably comprises optical waveguide 20, an outer jacket 23 of conventional construction and a plurality of strength members 24, for example KEVLAR® reinforced aramid fiber available from E.I. du Pont de Nemours and Company, positioned between the optical waveguide 20 and the outer jacket 23. In other embodiments, separate end lengths of jacketed optical fiber 22 may be fused or otherwise spliced to the ends 25 of the central length of unjacketed optical fiber 21 to form the optical waveguide 20. Optical connectors 26 are terminated at the free ends of both end lengths of jacketed optical fiber 22 so that the optical waveguide 20 can be connected between the optical test equipment 14 and the optical network 12. Any number of conventional optical connectors 26, including but not limited to SC, ST and FC type connectors, can be terminated to the end lengths of jacketed optical fiber 22. The choice of optical connectors 26 will be dependent upon the optical network and the type of optical test equipment 14 with which the test fiber box 10 is to be used. In the exemplary embodiments shown and described herein, the optical waveguide 20 is wound, or reeled, onto a generally cylindrical spool 40 disposed within and capable of rotating relative to the housing 30.

Figure 3:
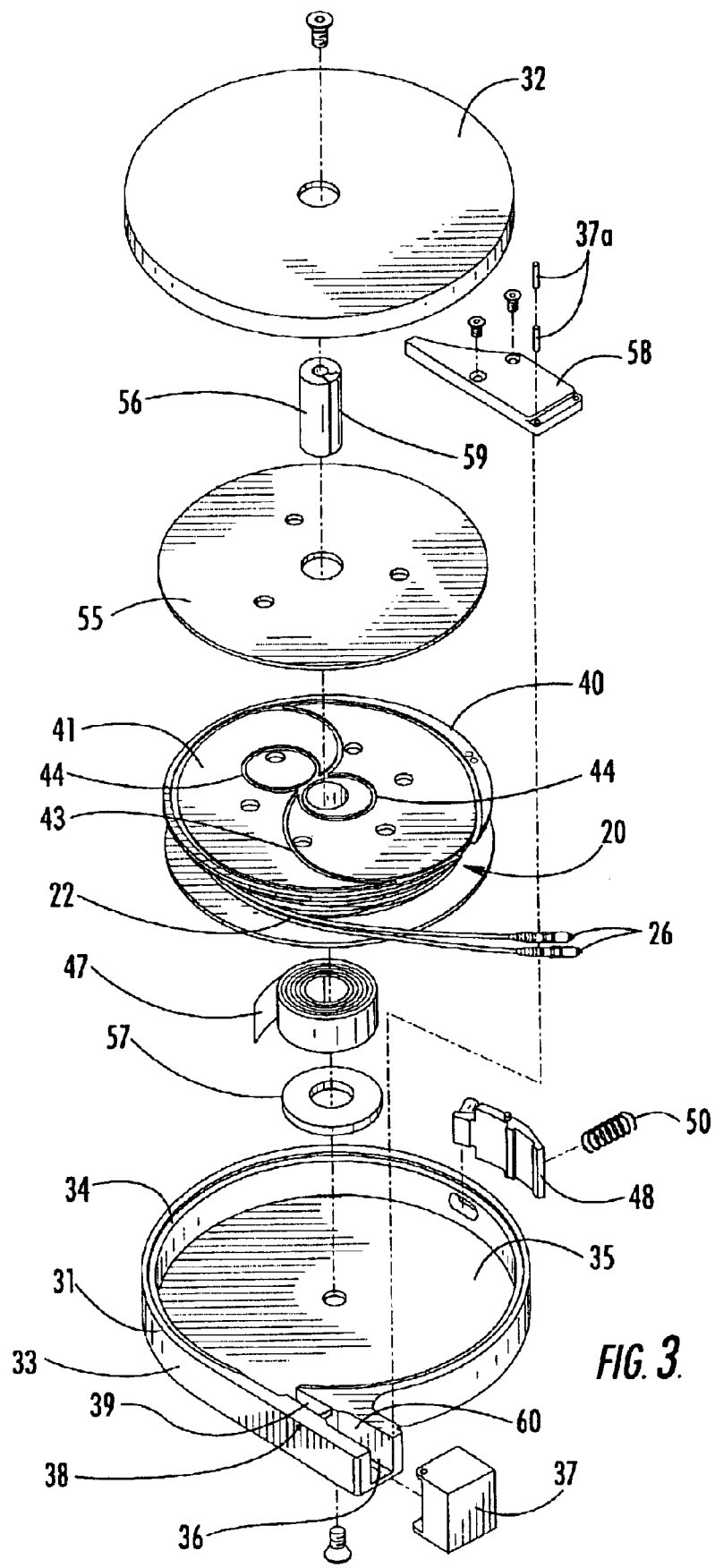
FIG. 3 is an exploded perspective view showing the internal components of the retractable optical fiber assembly of FIG. 1.

Spool 40 may be formed in any manner, but is preferably molded from a conventional thermoplastic material, for example LEXAN® polycarbonate resin sheet material available from General Electric Company. The spool 40 comprises two circular outer flanges 41 located in conventional fashion on opposite ends of a cylindrical central hub 40a. The optical waveguide 20 is wound around the central hub 40a and onto the spool 40 such that the two end lengths of jacketed optical fiber 22 extend outwardly from the spool 40, as will be described in greater detail hereinafter. Preferably, the optical waveguide 20 is reeled onto the spool 40 in such manner that the end lengths of jacketed optical fiber 22 extend outwardly from the spool 40 side-by-side in the same direction (FIG. 3). Thus, both end lengths of the jacketed optical fiber 22 can be extracted off the spool 40 and the optical connectors 26 can be connected to the optical test equipment 14 and the optical network 12.

Figure 4:
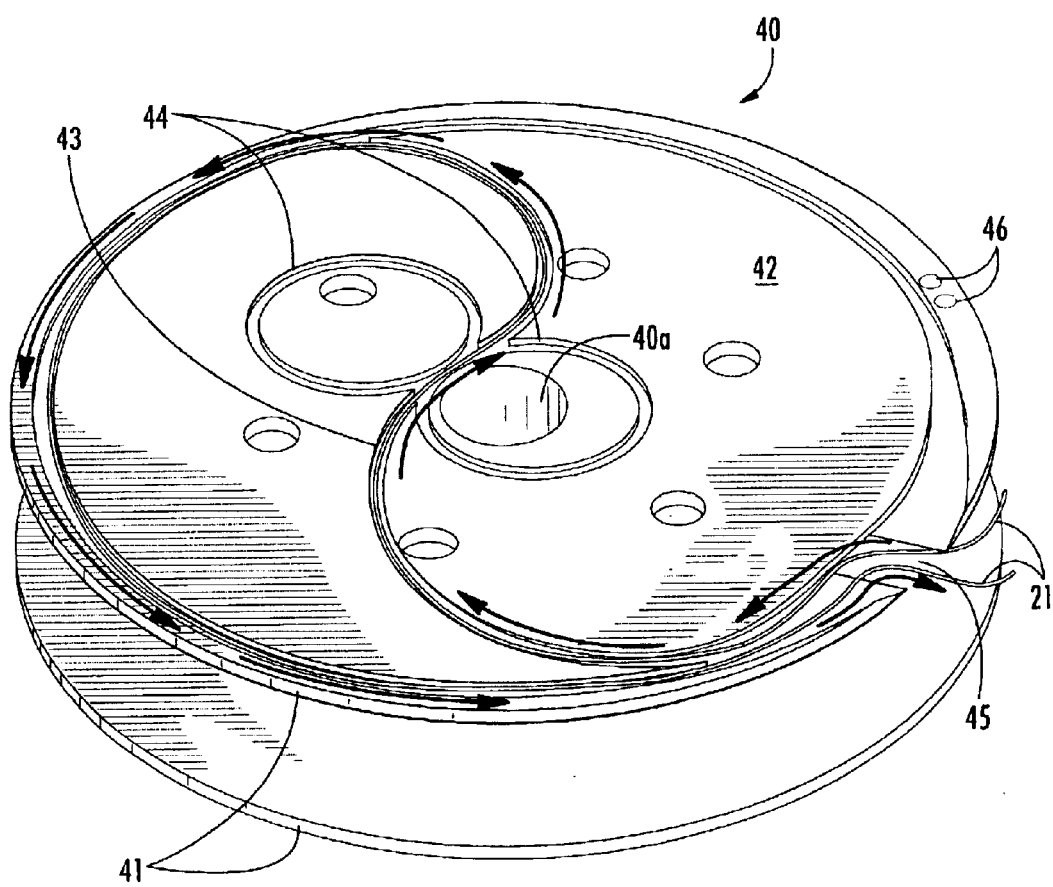
FIG. 4 is an enlarged perspective view illustrating an exemplary manner in which the central length of unjacketed optical fiber may be configured on the spool to reverse the direction of one end of the optical waveguide, while maintaining the minimum bend radius.
Figure 5:
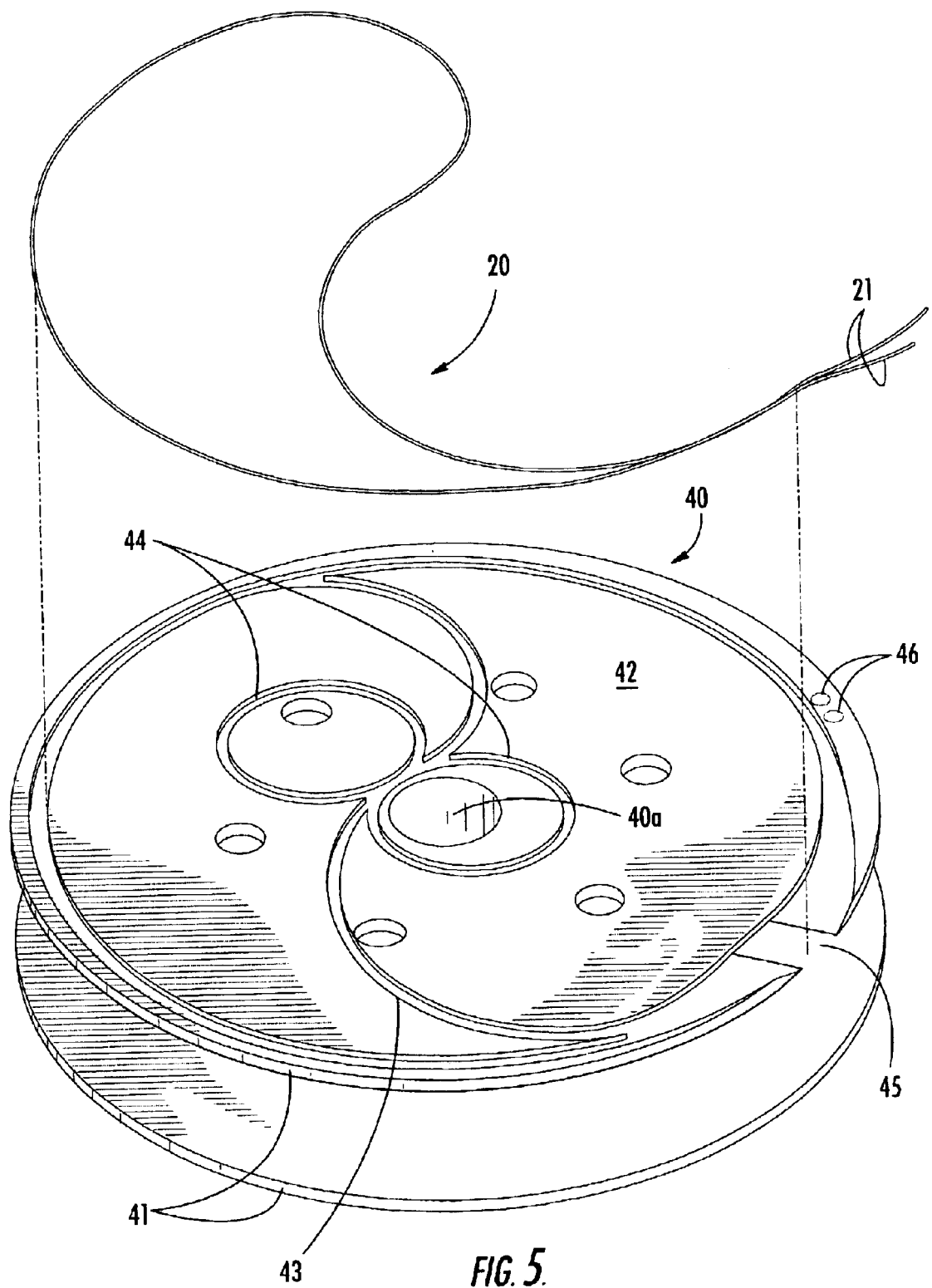
FIG. 5 is another perspective view of the spool shown with the central length of unjacketed optical fiber of the optical waveguide exploded from the spool.

FIGS. 4 and 5 illustrate an exemplary manner in which the central length of unjacketed optical fiber 21 may be configured on the spool 40 to reverse the direction of one end 25 of the optical waveguide 20, while maintaining the minimum bend radius of the optical waveguide 20. As a result, both end lengths of jacketed optical fiber 22 will extend outwardly from the spool 40 in the same direction and may be extracted off the spool 40 and retracted onto the spool 40 in a preferred manner. When the test fiber box 10 is assembled using this technique, the central length of unjacketed optical fiber 21 cannot be bent or curved beyond a radius of curvature that is small enough to introduce significant losses and/or attenuations in the signal transmitted though the optical waveguide 20. A curved fiber routing channel 43 provided on an exterior face 42 of one of the spool flanges 41 insures that the radius of curvature of the central length of unjacketed optical fiber 21 will not be less than the minimum radius of curvature of the optical waveguide 20 at which losses or attenuation due to excessive bending could be introduced, typically about 1.5 inches. The minimum radius of the channel 43 is equal to or greater than the minimum bend radius of the optical waveguide 20 with which the spool 40 is to be used, and the width of the channel 43 is slightly greater than the diameter of the central length of unjacketed optical fiber 21. When the central length of unjacketed optical fiber 21 is positioned within channel 43, the opposite ends of the optical waveguide 20 will extend outwardly from the spool 40 in the same direction towards an exit port 36 provided in the housing 30 so that the end lengths of jacketed optical fiber 22 and optical connectors 26 can be extracted off the spool 40 and retracted onto the spool 40.

Channel 43 preferably comprises an S-shaped or teardrop-shaped profile, commonly referred to as a "ying-yang," because the direction of travel of the optical fiber is reversed as the profile is traversed. The "ying-yang" configuration is especially desirable because it avoids crossover of the optical fiber, which may result in twisting and subsequent deterioration or breakage of the optical fiber. The channel 43 with the "ying-yang" configuration also permits the central length of unjacketed optical fiber 21 to transition smoothly from the exterior face 42 of the spool flange 41 to the area surrounding the central hub 40a between the spool flanges 41. A slot 45 extends inwardly from the outer edge of the spool flange 41 and intersects the channel 43. The radial extent of slot 45 is sufficient so that the optical waveguide 20 will not be crimped or kinked in the transition between the channel 43 on the exterior face 42 and the area between the flanges 41. In this manner, the same spool 40 can be used for optical waveguides 20 having significantly different lengths and intended for use with different optical test equipment 14 and/or optical networks 12. Annular shims may also be inserted around the central hub 40a when a spool 40 is used for shorter length optical waveguides 20 as an additional means of preventing damage to the optical waveguide fiber 20 due to crimping or kinking at the location of the slot 45. After the end of the central length of unjacketed optical fiber 21 has traversed the channel 43 and exited through the slot 45, the spool 40 is rotated in a conventional manner to reel the remaining length of unjacketed optical fiber 21 onto the spool 40.

Mandrel wrap channels 44 are located on opposite sides of the channel 43 on the exterior face 42. Each of the mandrel wrap channels 44 intersects the channel 43 near the center of the spool flange 41, and one of the mandrel wrap channels 44 extends around a hole extending through the central hub 40a of the spool 40. The mandrel wrap channels 44 are used when the optical waveguide 20 comprises multimode optical fiber, but are not necessary when the optical waveguide 20 comprises only single mode optical fiber. Mandrel wrap channels 44 comprise means for reducing the amplitude of higher-order modes propagating in the cladding area of multimode optical fibers in accordance with EIA/TIA/ANSI loss testing recommendations. The two channels 44 are intended for use with multimode optical fibers having different standard core sizes. For example, one of the channels 44 may be configured to receive 50 micron multimode optical fiber, while the other channel 44 is configured for use with 62.5 micron multimode optical fiber.

A multimode optical fiber is first routed into the fiber channel 43, and then routed into the appropriately sized mandrel wrap channel 44 at its intersection with the channel 43. Typically five turns of the multimode optical fiber in the corresponding mandrel wrap channel 44 are sufficient to reduce the amplitude of higher-order modes propagating in the cladding area of the multimode optical fiber in accordance with EIA/TIA/ANSI loss testing recommendations.

Figure 9:
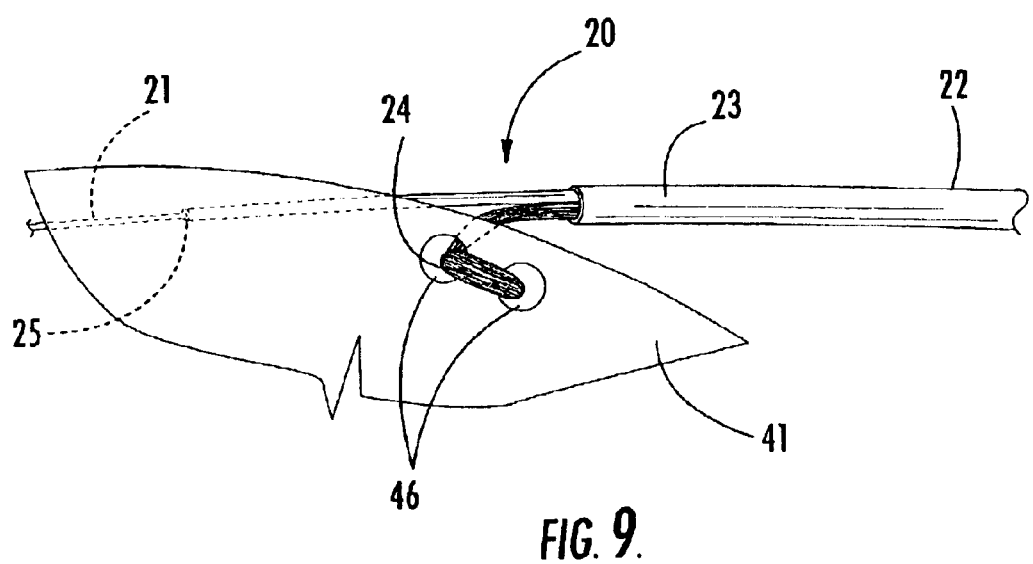
FIG. 9 is an enlarged detail view of a portion of the spool of the retractable optical fiber assembly of FIG. 1 illustrating an exemplary manner in which the end lengths of jacketed optical fiber may be strain relieved to the spool.

Once the central length of an unjacketed single mode or multimode optical fiber 21 is routed in the appropriate channel(s) 43 (44) on the exterior face 42 of the spool flange 41, both end lengths of jacketed optical fiber 22 are attached to the spool 40. As best shown in FIG. 9, a pair of tie-down holes 46 are located adjacent the outer edge of each spool flange 41 of the spool 40. The tie-down holes 46 are used to strain relieve the end lengths of jacketed optical fiber 22 to the spool 40. As shown, the strength members 24 extending beyond the jacket 23 on each end length of jacketed optical fiber 22 are threaded through the tie-down holes 46 and tied off. The two end lengths of jacketed optical fiber 22 may be tied off using the same tie-down holes 46, or may be tied off to tie-down holes 46 at different locations on the same spool flange 41. Preferably, however, the end lengths of jacketed optical fiber 22 are tied off using tie-down holes 46 on different spool flanges 41. More preferably, the locations of the tie-down holes 46 on the different spool flanges 41 are aligned opposite one another so that the two end lengths of jacketed optical fiber 22 remain side-by-side and parallel when extracted off the spool 40 and retracted onto the spool 40. When the end lengths of jacketed optical fiber 22 are secured to the spool 40 in this manner, the tensile forces applied to the optical waveguide 20 to cause rotation of the spool 40 (and thereby extract the jacketed optical fiber 22 off the spool 40) will be transmitted through the jacket 23 and/or the strength members 24 to the spool 40. Similarly when the spool 40 is rotated in the opposite direction (to retract the jacketed optical fiber 22 onto the spool 40, as will be described), the tensile forces applied to the optical waveguide 20 will be transferred from the spool 40 through the jacket 23 and/or strength members 24. In this manner the optical waveguide 20, and in particular the central length of unjacketed optical fiber 21, will be isolated from the tensile forces applied during extraction and retraction of the end lengths of jacketed optical fiber 22.

The end lengths of jacketed optical fiber 22 surround the central length of unjacketed optical fiber 21 when the optical waveguide 20 is reeled on the spool 40 so that the central length of unjacketed optical fiber 21 is not exposed to the environment outside the housing 30. The portion of the unjacketed optical fiber 21 disposed in fiber routing channel 43, and in one or both of the mandrel wrap channels 44 for multimode fiber, will be separately covered by a protective cover 55 (FIG. 3) that is secured to the exterior face 42 of the spool flange 41. Thus, the unjacketed optical fiber 21 disposed in channel 43, and possibly in mandrel wrap channels 44, will be encapsulated between the cover 55 and the exterior face 42 of spool flange 41. Cover 55 may be fabricated from any suitable lightweight, substantially rigid material, such as MYLAR® available from E.I. du Pont de Nemours and Company. The spool 40 is positioned within the housing 30 where optical waveguide 20, when reeled, will be completely enclosed and protected from dust, dirt and other potentially damaging environmental conditions. Only the end lengths of jacketed optical fiber 22 and the optical connectors 26 can be extracted from the housing 30. Since the jacket 23 and/or the strength members 24 are physically attached to the spool 40, a short portion of the end lengths of jacketed optical fiber 22 will remain within the housing 30 even when the maximum length of jacketed optical cable 22 is extracted from the housing 30. As shown, the housing 30 is substantially cylindrical so that with the generally cylindrical spool 40 disposed within the housing 30, the complete retractable optical fiber assembly (i.e., test fiber box) 10 will occupy a relatively small volume. The test fiber box 10 will therefore be compact for transport and suitable for use in cramped spaces.

As shown herein, the housing 30 is fabricated in two mating sections consisting of a housing base 31 and a housing cover 32. As best seen in FIG. 3, the housing base 31 defines a generally cylindrical interior cavity 35, which is dimensioned to receive the spool 40 with the optical waveguide 20 reeled on the spool 40. The cavity 35 is formed by an annular housing wall 33, extending upwardly from the floor of the housing base 31. A recessed ledge 34 formed at the top of the housing wall 33 allows the housing cover 32 to rest along the top of the housing base 31 to enclose the interior cavity 35. The housing cover 32 is mounted on the top of the housing base 31 after the spool 40 with the optical waveguide 20 reeled on the spool 40 is positioned within the interior cavity 35. Both the housing base 31 and the housing cover 32 may be formed of a rigid metal or a durable plastic. Alternatively, one of the housing components may be made of metal and the other made of plastic. Other materials may also be used to fabricate the housing base 31 and housing cover 32, such as a resin/fiber composite (e.g., glass epoxy) or a polycarbonate sheet molding compound (e.g., LEXAN®). In another embodiment, the housing 30 could comprise top and bottom plates spaced apart by a cylindrical shell. Although the compact size might be compromised, the housing 30 need not be cylindrical, and could instead be rectangular, hexagonal, octagonal, or some other non-cylindrical geometric configuration. The interior cavity 35, in which the spool 40 is disposed, likewise does not need to be cylindrical, as long as there is enough space within the interior cavity 35 to permit the spool 40 to rotate freely to extract the optical waveguide from the housing 30 and to retract the optical waveguide 20 into the housing 30. For example, if the housing 30 was rectangular, the circular spool 40 could rest in a rectangular interior cavity 35.

The optical waveguide 20 is extracted from and retracted into the interior cavity 35 of the housing 30 through an exit port 36 provided in the housing wall 33. The generally circular housing wall 33 defines an inner tangential groove 39 communicating between the interior cavity 35 and the exterior of the test fiber box 10. Tangential groove 39 is large enough for the pair of end lengths of jacketed optical fiber 22 to pass through, but not large enough to permit the optical connectors 26 to pass. An outer tangential groove 60 adjacent the inner tangential groove 39 is large enough to receive at least the rear portions of the optical connectors 26 therein when the optical waveguide 20 is fully retracted into the housing 30. A separator pin 38 extends laterally through the tangential groove 39 to prevent the end lengths of jacketed optical fiber 22 from twisting as they are extracted from or retracted into the housing 30 so that the optical fiber will not be damaged. A removable exit port cover 58 may be attached, for example with screws, to the housing base 31 to close off the tangential groove 39 and tangential groove 60. As shown, a protective cap 37 is also provided to close the open end of exit port 36 (i.e., tangential groove 60). The cap 37 is movably attached to the housing 30 adjacent the open end of tangential groove 60. For example, the cap 37 may be pinned at an edge, and preferably at an outer edge, by one or more smooth, cylindrical pins 37a. Accordingly, the cap 37 can be rotated between an open position, in which the end lengths of jacketed optical fiber 22 can be extracted or retracted, and a closed position, in which the optical waveguide 20 is completely retracted within the housing 30 and the optical connectors 26 are protected by the closed cap 37 from environmental damage.

Figure 2:
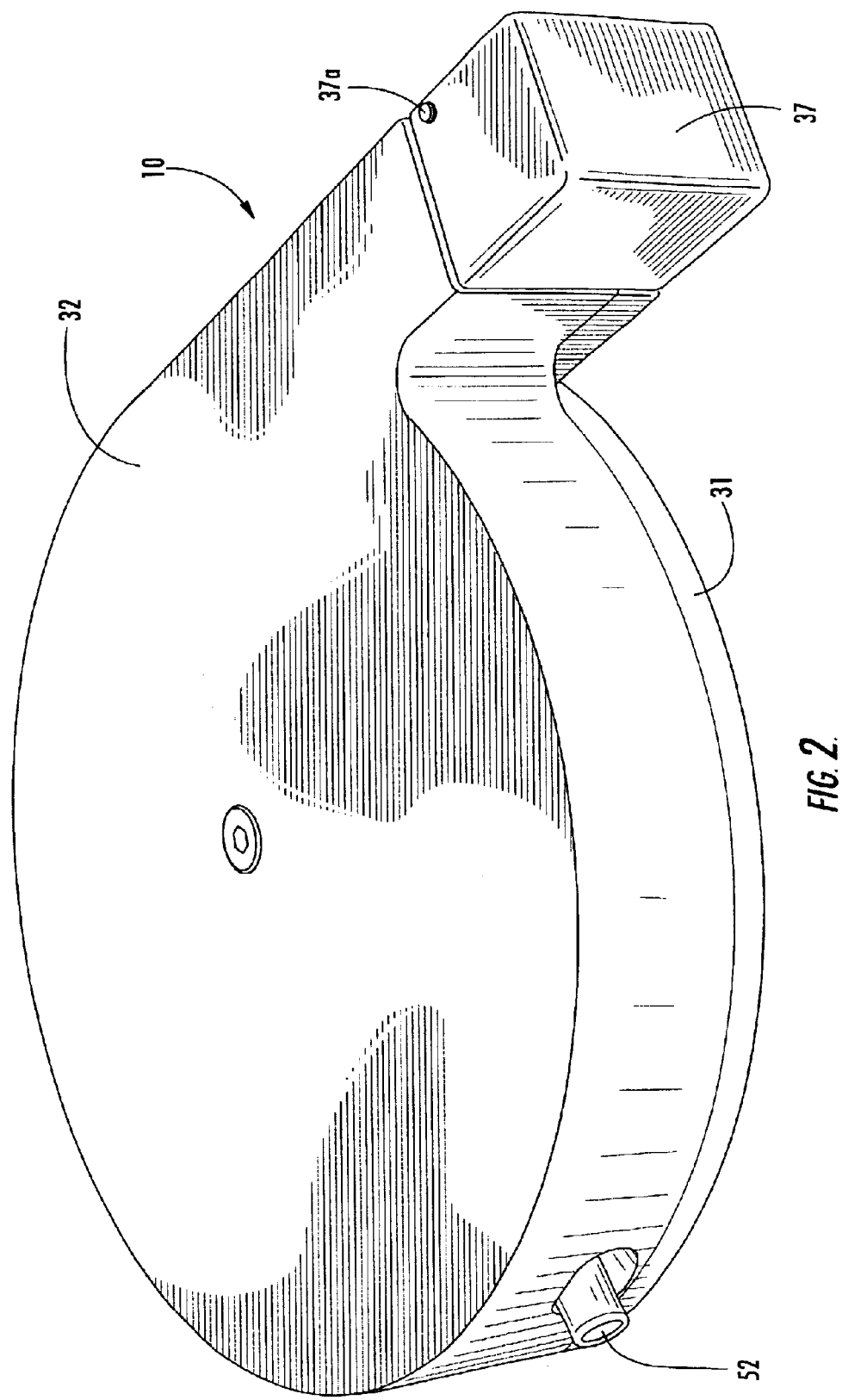
FIG. 2 is a perspective view of the retractable optical fiber assembly of FIG. 1 shown with the optical waveguide retracted onto the spool and stored within the housing.
Figure 8:
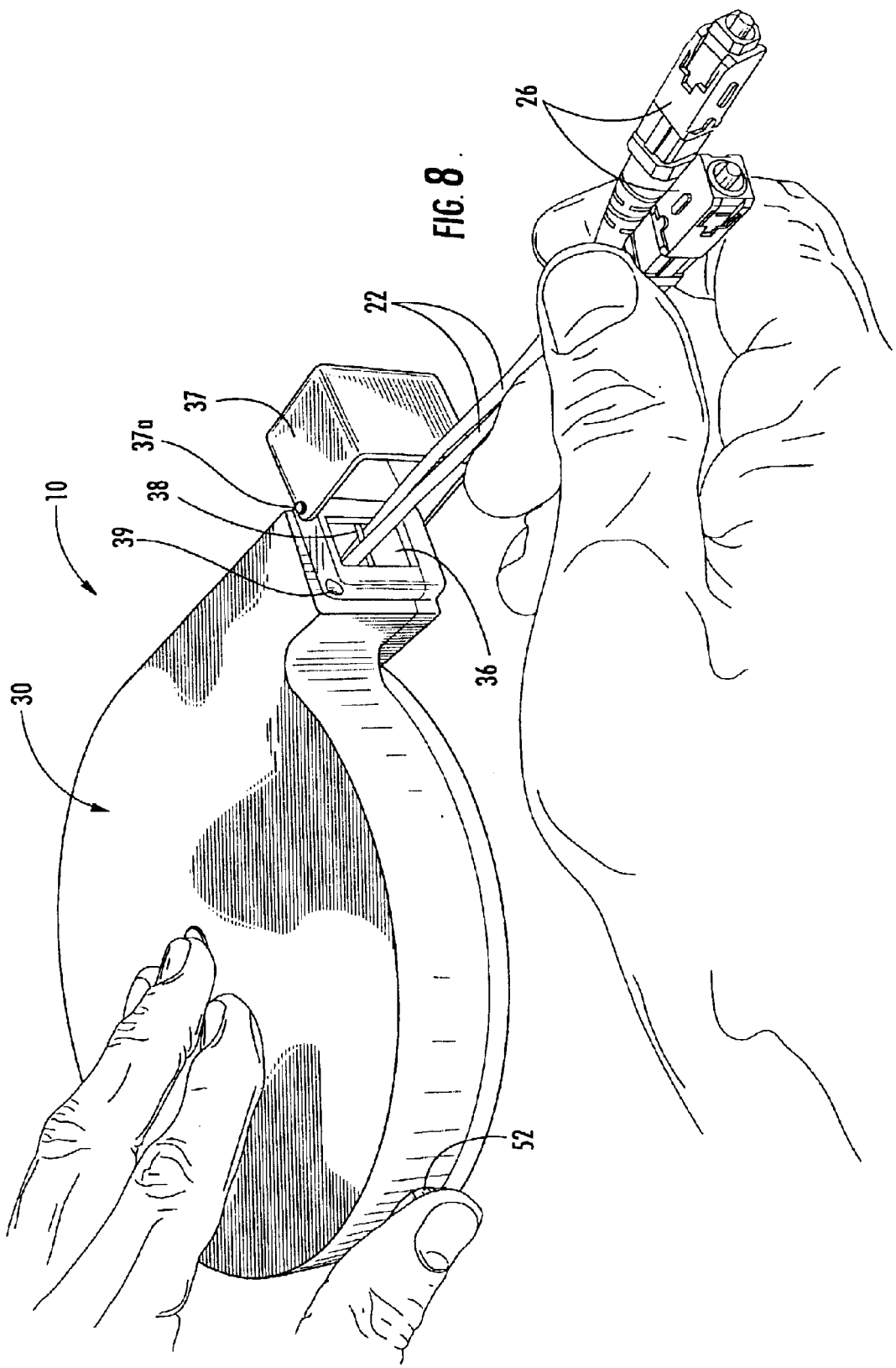
FIG. 8 is a perspective view of the retractable optical fiber assembly of FIG. 1 illustrating an exemplary manner in which the end lengths of jacketed optical fiber may be grasped to extract the jacketed optical fiber and connectors to connect the optical waveguide between optical test equipment and an optical network.

As best shown in FIG. 8, a protruding retaining member 39, such as a partially recessed spring-loaded ball, is provided on the outermost end of the exit port 36. The retaining member 39 engages the underside of the cap 37 to retain the cap 37 in the closed position (FIG. 2), but still permits the cap 37 to be moved to the open position (FIG. 8) to extract the end lengths of jacketed optical fiber 22 and the optical connectors 26. The cap 37 preferably has a thin wall and a generally rectangular interior cavity that will provide space for the front portions of the optical connectors 26 when the optical waveguide 20 is entirely retracted within the housing 30. When the cap 37 is in the closed position, the optical connectors 26 are completely enclosed within the tangential groove 60 and the cap 37 so that separate connector dust caps, which can be easily lost, are not needed. The front portions of the optical connectors 26 will, however, extend slightly beyond the outer end of the tangential groove 60 so that the optical connectors 26 can be readily grasped to extract the end lengths of jacketed optical fiber 22 and the optical connectors 26 from the housing 30 after the cap 37 is rotated to the open position.

As shown in the exemplary embodiments shown and described herein, the spool 40 and the optical waveguide 20 reeled on the spool 40 are not entirely free to rotate relative to the housing 30, but the spool 40 is biased in a first direction relative to the housing 30 so that the optical waveguide 20 is automatically retracted into the housing 30. As best shown in FIG. 3, a spiral coiled spring or helical torsion spring 47, similar to a clock spring, is disposed between the spool 40 and a tubular mounting sleeve 56 secured to the housing 30. The mounting sleeve 56 is secured, for example by screws, to both the housing cover 32 and the housing base 31. The torsion spring 47 encircles the mounting sleeve 56 and the mounting sleeve 56 extends through the central hub 40a of the spool 40 concentric with the axis of rotation of the spool 40. The torsion spring 47 may be separated from the housing base 31 by a spring washer 57 having a smooth upper surface. Although not shown, at least a portion of the torsion spring 47 is seated within the central hub 40a of the spool 40 and the outer end of the torsion spring 47 is attached to the spool 40 in a known manner, for example by inserting the outer end of the torsion spring 47 into a vertical slot formed on the interior of the central hub 40a. The inner end of the torsion spring 47 is attached to the mounting sleeve 56, for example by inserting the inner end of the torsion spring 47 into a vertical slot 59 formed in the mounting sleeve 56. As a result, the inner end of the torsion spring 47 is fixed relative to the housing 30. With the opposite ends of the torsion spring 47 thus attached, rotation of the spool 40 in a first direction compresses the torsion spring 47, while rotation of the spool 40 in a second direction, opposite to the first direction, relaxes the torsion spring 47. Thus, extraction of the end lengths of jacketed optical fiber 22 and the accompanying rotation of the spool 40 causes the torsion spring 47 to compress. The compressed torsion spring 47 exerts a returning force on the spool 40 that biases it in the second direction, thereby tending to retract the end lengths of jacketed optical fiber 22 into the housing 30.

Figure 6:
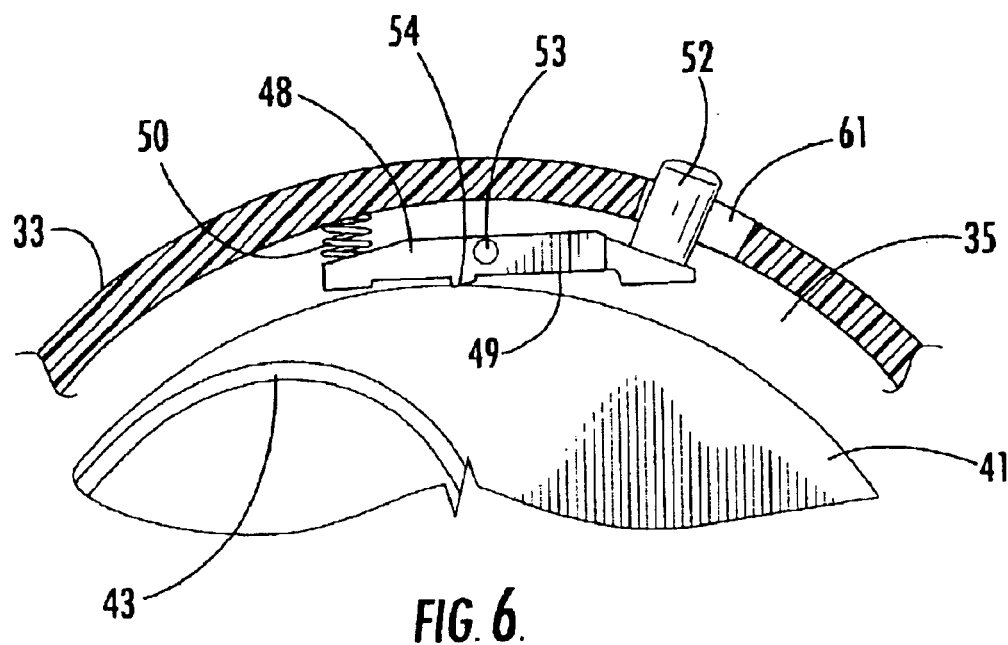
FIG. 6 is a partial cross-section of a portion of the spool and the housing of the retractable optical fiber assembly of FIG. 1 showing the mechanical stop engaged for preventing rotation of the spool.
Figure 7:
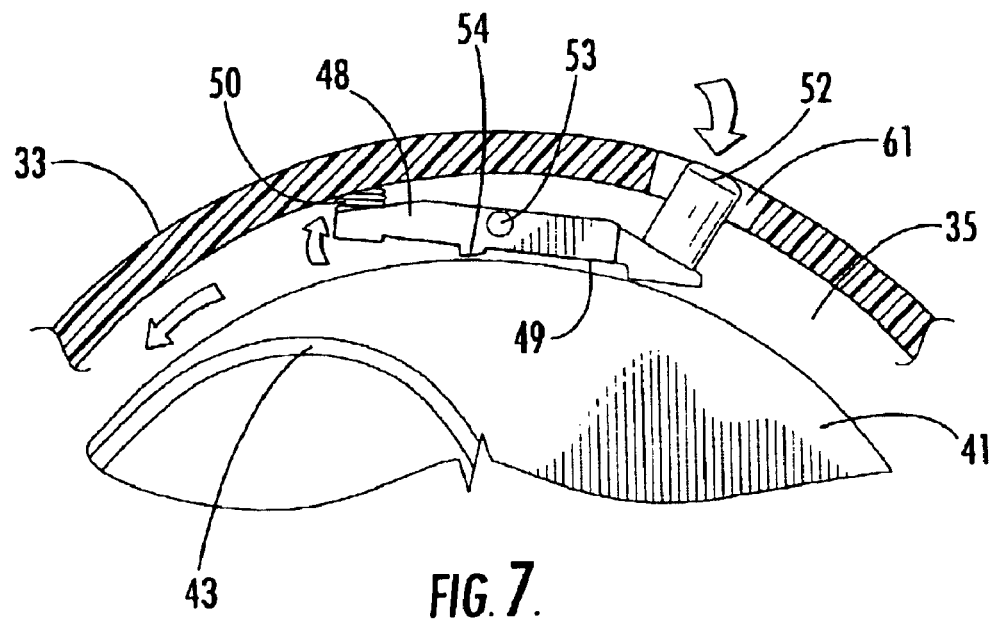
FIG. 7 is a partial cross-section of the portion of the spool and the housing shown in FIG. 6 illustrating the manner in which the mechanical stop is released to permit rotation of the spool and allow extraction or retraction of the end lengths of jacketed optical fiber.

The test fiber box 10 further comprises a mechanical stop 48 disposed between the peripheral edges of the spool flanges 41 and the housing wall 33. Although residing primarily in the interior cavity 35 of the housing 30, the mechanical stop 48 comprises an actuator button 52 protruding through an opening 61 formed through the housing wall 33. The mechanical stop further comprises a stop arm 49 that pivots about a stud 53 protruding laterally through the stop arm 49 from at least one of the housing base 31 and housing cover 32. The action of mechanical stop 48 is illustrated in FIGS. 6 and 7. A linear coil spring 50 is disposed between the end of the stop arm 49 opposite the actuator button 52 and the housing wall 33. Linear spring 50 acts as an extension member that biases the stop arm 49 counterclockwise about the stud 53, as shown in FIG. 6. When depressed, the actuator button 52 rotates the stop arm 49 clockwise about the stud 53 against the linear spring 50. FIG. 6 illustrates the mechanical stop 48 in an engaged position which prevents rotation of the spool 40, and thus, extraction of the optical waveguide 20 reeled on the spool 40 from the housing 30 or retraction of the optical waveguide 20 reeled on the spool 40 into the housing 30. In the engaged position, stop ridges 54 frictionally engage the peripheral edges of the spool flanges 41 to prevent rotation of the spool 40. As previously mentioned, the mechanical stop 48 is biased in the engaged position so that unless the actuator button 52 is depressed and the stop arm 49 rotates clockwise, the spool 40 will not rotate relative to the housing 30.

FIG. 7 illustrates the released position that results when the actuator button 52 is depressed from the exterior of the housing 30. In the released position, the spool 40 is free to rotate relative to the housing 30 for either extraction or retraction of the end lengths of jacketed optical fiber 22 and the optical connectors 26. With the mechanical stop 48 in the released position (FIG. 7) and the end lengths of jacketed optical fiber 22 extracted though the exit port 36, the torsion spring 47 is compressed (i.e., coiled beyond the static position) so that a restoring force is stored in the torsion spring 47. When the end lengths of jacketed optical fiber 22 are released, the spool 40 rotates relative to the housing 30 to relieve the restoring force in torsion spring 47 unless the actuator button 52 is released and the mechanical stop 48 is in the engaged position. Of course, the actuator button 52 would be released and the mechanical stop 48 engaged when the optical waveguide 20 is connected between optical test equipment 14 and an optical network 12. After the optical connectors 26 are disconnected from the optical network 12 and the optical test equipment 14, the actuator button 52 is then depressed to release the mechanical stop 48, thereby permitting rotation of the spool 40 (which is biased by the torsion spring 47 in the second direction) and retraction of the end lengths of jacketed optical fiber 22 under the influence of torsion spring 47. Since the end lengths of jacketed optical fiber 22 are of approximately equal length, both end lengths 22 and their respective optical connectors 26 will be retracted into the housing 30 in unison, and the connectors 26 will be received within the exit port 36 so that the cap 37 can be closed to protect the ends of the optical connectors 26.

It should be understood that neither the torsion spring 47 nor the mechanical stop 48 are essential, even though they may be desirable. For instance, a simple crank can be provided on the side the housing 30 of the test fiber box 10 to allow a user to retract the end lengths of jacketed optical fiber 22 back into the housing. Other embodiments could employ a functionally equivalent torsion spring having a different configuration, or a functionally equivalent mechanical stop having a different configuration. For example, a mechanical stop could be configured on the side of the housing 30 that engages ratchet surfaces provided on the side of the spool 40. Other embodiments could also employ multiple spools of optical waveguide so that the same test fiber box could be attached between multiple sets of optical test equipment and/or multiple optical networks. Alternatively more than one optical waveguide could be reeled onto the same spool so that more than one pair of end lengths of jacketed optical fiber could be withdrawn at the same time.

Although the retractable optical fiber assembly shown and described herein is especially suited for use in connecting optical test or monitoring equipment to an optical network, it should be understood that it need not be so limited. The retractable optical fiber assembly could also be employed as a readily accessible jumper if needed. Therefore, the exemplary embodiments and the alternatives discussed herein are merely representative in nature and should be considered to be limiting in any manner. Accordingly, the invention is not limited to the representative embodiments and instead should be understood and defined as broadly as possible by the appended claims.

That which is claimed:

1. A retractable optical fiber assembly comprising:
   a housing;
   a spool rotatably disposed within the housing; and
   a continuous length of an optical waveguide reeled onto the spool, the optical waveguide comprising a predetermined length of unjacketed optical fiber and a predetermined length of jacketed optical fiber wound radially outwardly of the unjacketed optical fiber.

2. The retractable optical fiber assembly of claim 1 wherein the housing surrounds the spool and includes an exit port through which the jacketed optical fiber is extracted and retracted.

3. The retractable optical fiber assembly of claim 1 wherein the unjacketed optical fiber forms a central length of the optical waveguide and the jacketed optical fiber forms a pair of opposite end lengths of the optical waveguide.

4. The retractable optical fiber assembly of claim 3 further comprising an optical connector terminated to each of the end lengths of the optical waveguide.

5. The retractable optical fiber assembly of claim 3 wherein a curved channel is formed on an exterior face of the spool and wherein the central length of the optical waveguide is positioned within the channel, the channel reversing the direction of travel of the central length of the optical waveguide relative to the spool.

6. The retractable optical fiber assembly of claim 1 further comprising torsion spring means operably positioned between the housing and the spool, the jacketed optical fiber being biased on the spool by a retracting force exerted by the torsion spring means.

7. The retractable optical fiber assembly of claim 6 further comprising a mechanical stop for preventing rotation of the spool.

8. The retractable optical fiber assembly of claim 7 wherein the mechanical stop is releasable for extracting the jacketed optical fiber from the housing and for retracting the jacketed optical fiber into the housing.

9. The retractable optical fiber assembly of claim 1 wherein the housing defines an exit port through which the jacketed optical fiber is extracted and retracted and wherein the retractable optical fiber assembly further comprises a cover movably mounted on the housing to open and close the exit port.

10. The retractable optical fiber assembly of claim 9 wherein the optical waveguide is completely enclosed within the housing when the cover is in a closed position and wherein the jacketed optical fiber is accessible when the cover is in an open position.

11. The retractable optical fiber assembly of claim 1 wherein mandrel channels are located on an exterior face of the spool, the mandrel channels comprising means for reducing the amplitude of higher-order modes propagating in a cladding region of a multimode optical fiber.

12. The retractable optical fiber assembly of claim 1 wherein the jacketed optical fiber is strain relieved to the spool.

13. The retractable optical fiber assembly of claim 1 wherein the spool is rotatably disposed in a cylindrical cavity formed in the housing.

14. A retractable optical fiber assembly comprising:
   a housing defining an interior cavity and an exit port;
   a spool rotatably disposed on the housing within the interior cavity; and
   a continuous length of an optical waveguide reeled onto the spool, the optical waveguide having a central portion comprising a predetermined length of unjacketed optical fiber and a pair of end portions comprising predetermined lengths of jacketed optical fiber wound radially outwardly of the unjacketed optical fiber; and
   wherein the end portions of jacketed optical fiber are extracted off the spool and retracted onto the spool through the exit port.

15. The assembly of claim 14 wherein both end portions of jacketed optical fiber are wound on the spool in the same direction.

16. The assembly of claim 14 further comprising means for exerting a biasing force for retracting the end portions of jacketed optical fiber onto the spool and a mechanical stop for preventing rotation of the spool, the mechanical stop being releasable to permit the end portions of jacketed optical fiber to be extracted off the spool against the biasing force.

17. A test fiber box for testing an optical network, the test fiber box comprising:
   a continuous length of an optical waveguide reeled onto a rotatable spool, a central portion of the optical waveguide comprising an unjacketed optical fiber and a pair of end portions of the optical waveguide comprising jacketed optical fiber having an optical connector terminated to the free end thereof, rotation of the spool in a first direction extracting the jacketed optical fiber and connectors off the spool for connection between optical test equipment and the optical network, rotation of the spool in a second direction opposite to the first direction retracting the jacketed optical fiber onto the spool for storage within the test fiber box.

18. The test fiber box of claim 17 further comprising a housing defining an interior cavity, the spool rotatably disposed within the interior cavity and biased in the second direction relative to the housing.

19. The test fiber box of claim 17 wherein the jacketed optical fiber is strain relieved to the spool so that the unjacketed optical fiber is not extracted off the spool when the spool is rotated in the first direction.

20. The test fiber box of claim 17 wherein the spool has a curved channel formed on an exterior face and wherein the unjacketed optical fiber is positioned within the channel so that the direction of travel of one end of the unjacketed optical fiber is reversed.

21. The test fiber box of claim 20 wherein the channel has a radius of curvature at least equal to the minimum bend radius of the unjacketed optical fiber.

22. The test fiber box of claim 21 wherein the optical waveguide comprises a single mode optical fiber.

23. The test fiber box of claim 17 wherein the optical waveguide comprises a multimode optical fiber and wherein an exterior face of the spool has mandrel wrap channels comprising means for reducing the amplitude of higher-order modes propagating in a cladding region of the multimode optical fiber.

24. The test fiber box of claim 17 wherein the optical waveguide has a length of not more than about 1000 meters.

* * * * *